(12) United States Patent
Lenz

(10) Patent No.: US 7,079,625 B2
(45) Date of Patent: Jul. 18, 2006

(54) X-RAY ANODE HAVING AN ELECTRON INCIDENT SURFACE SCORED BY MICROSLITS

(75) Inventor: Eberhard Lenz, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 98 days.

(21) Appl. No.: 10/760,827

(22) Filed: Jan. 20, 2004

(65) Prior Publication Data

US 2004/0208288 A1    Oct. 21, 2004

(30) Foreign Application Priority Data

Jan. 20, 2003 (DE) .............................. 103 01 946
Dec. 19, 2003 (DE) .............................. 103 60 018

(51) Int. Cl.
*H01J 35/10* (2006.01)

(52) U.S. Cl. ........................... 378/144; 378/127

(58) Field of Classification Search ............... 378/125, 378/127, 128, 143, 144
See application file for complete search history.

(56) References Cited

U.S. PATENT DOCUMENTS

| | | | | |
|---|---|---|---|---|
| 1,927,456 A | * | 9/1933 | Jonas | 313/40 |
| 2,071,696 A | * | 2/1937 | Jonas | 378/127 |
| 3,751,702 A | * | 8/1973 | Dietz | 378/125 |
| 3,819,971 A | * | 6/1974 | Kaplan et al. | 378/144 |
| 3,836,803 A | * | 9/1974 | Dietz et al. | 378/144 |
| 3,836,804 A | * | 9/1974 | Frens et al. | 378/125 |
| 3,973,156 A | * | 8/1976 | Schreiber | 378/144 |
| 4,531,227 A | * | 7/1985 | Fukuhara et al. | 378/144 |
| 4,991,194 A | * | 2/1991 | Laurent et al. | 378/144 |
| 5,629,970 A | * | 5/1997 | Woodruff et al. | 378/143 |
| 5,681,616 A | * | 10/1997 | Gupta et al. | 427/264 |
| 2003/0207079 A1 | | 11/2003 | Subramanian | |

FOREIGN PATENT DOCUMENTS

JP     02172149 A  *  7/1990

OTHER PUBLICATIONS

Patent Abstracts of Japan Publication No. 02093018.

* cited by examiner

*Primary Examiner*—Edward J. Glick
*Assistant Examiner*—Thomas R. Artman
(74) *Attorney, Agent, or Firm*—Schiff Hardin LLP

(57) ABSTRACT

An X-ray anode is produced by scoring at least a region of a surface of the anode, on which electrons are incident, with a number of defined microslits, thereby making the surface, or at least the region thereof, highly thermally stressable.

18 Claims, 8 Drawing Sheets

X-RAY ANODE HAVING AN ELECTRON INCIDENT SURFACE SCORED BY MICROSLITS

BACKGROUND OF THE INVENTION

1. Field of the Invention

The present invention concerns an x-ray anode with a highly thermally stressable surface, as well as a method to produce such an x-ray anode.

2. Description of the Prior Art

X-ray anodes in conventional x-ray tubes have a surface that, due to its intended purpose, is exposed to a significant thermal stress that varies over a large range. To generate the x-ray radiation, the surface of such an x-ray anode is struck by a beam of high-energy electrons. Upon deceleration of the electrons in the surface of the x-ray anode, the desired x-ray radiation results. At the point on the surface of the x-ray anode on which the electron beam strikes, known as the focal spot, temperatures of up to 2500° C. occur. In order to increase the lifespan of the x-ray tubes, in many cases rotating anode tubes are used in which a plate-like x-ray anode rotates around its axis of symmetry. The electron beam strikes this rotating anode in the radial outer region, meaning close to the circumference of the anode plate. Due to the rotation of the anode plate, the surface continuously moves away from underneath the focal spot that is fixed within the x-ray tube, such a focal path on the anode plate moves under the focal spot and the electrons do not always strike at the same location on the surface of the anode plate.

FIG. 2 shows, in an enlarged section, the more precise assembly of a conventional rotating anode, as well as the temperature ratios along the focal path surface. The rotating anode has a plate 4, for example made of Mo or TZM, on which a focal path layer 3, made of tungsten with an additive of rhenium (WRe) is located at the outer circumference. In larger rotating anodes, a layer 5 of graphite is often bonded with the plate 4 in order to increase the heat storage capacity. The focal spot B moves on the surface 2 of this focal path layer 3. The rotation direction of the anode plate is designated by the arrow direction R. During operation, an average temperature of approximately 1000° C. exists in the focal path layer 3. On the focal path surface 2, meaning in the first μm of the focal path layer 3, the temperature is approximately 1,500° C. Given one rotation under the focal spot B, the temperature curve at a specific surface point is indicated. Immediately upon being swept over by the electron focal spot B, the temperature at this location rises to approximately 2500° C. Thereafter, the temperature cools relatively quickly back to 2000° C., and then falls gradually to 1500° C., until finally the focal spot B sweeps over the appertaining point of the focal path surface 2 again.

The relatively powerful thermal shook when the electron beam, with its high energy density, sweeps over the focal path surface 2 leads to a thermal fatigue that results in a severe roughening of the focal path surface 2. FIG. 4 shows, in schematic view, a strongly magnified section through such a surface. Molar-like accumulations form between individual tears 11, such that a wavy roughening of the surface results. FIG. 3 shows a microscopic exposure of a part of the surface of a focal path of a conventional rotating anode plate at the end of its "lifetime" meaning at the time it must be taken out of service. The image area corresponds to approximately 2.64 mm$^2$. This microscopic image shows very clearly that melted droplets have formed on the surface, which project from the focal path like stalagmites, as well as thermal shock tears existing between the melted droplets. Individual cracks are designated by white arrows. In a more precise evaluation of the microscopic exposure shown in FIG. 3, in total of 194 crack formations were counted in 2.64 mm$^2$. Such cracks can grow to approximately 0.7 mm deep down into the surface. Due to the tear growth, the possibility is increased that particles will be released into the high-voltage space, the probability of high-voltage disruptions increasing as a result.

Furthermore, the increasing surface roughness of the focal path surface 2 leads to a reduction of the radiation yield. For explanation, reference is made to FIGS. 2 and 5. Typically, the focal path surface 2 is inclined outwardly at a small angle α of approximately 7° relative to the surface of the anode plate 1. Upon the electron beam striking the focal path surface 2, x-ray radiation is simultaneously emitted in all directions. An x-ray beam hemisphere 8 shown in FIG. 1 results over the focal path surface 2. Only a small part of the total emitted x-ray radiation is actually used as wanted x-ray radiation 10 directed to the examination subject; the largest part is radiated in other directions and is gated by a housing or by means of a diaphragm. As FIG. 1 shows, only the portion of the x-ray radiation 14 radiated very shallowly over the focal path surface 2 outwardly is used. This geometric arrangement has the advantage that the focal spot can be kept relatively large (normally approximately 10 mm×1 mm), in order to keep the load for the focal path surface as small as possible. Due to the use of only the portion of the x-ray radiation radiated shallowly outwardly over the plate surface, the effective size of the x-ray source point (which is a projection of the actual focal spot B located on the focal path surface 2 on the plane of the diaphragm 9) is reduced to smaller dimensions of, for example, 1 mm×1 mm. Due to the shrinking of the "effective x-ray source point", a better resolution is achieved in the x-ray exposure. FIG. 5 shows how the surface roughening leads to a radiation reduction in the direction of the used portion 10 of the x-ray radiation 14. While some rays 14 just manage to reach, via the diaphragm, over the roughened surface 2 to the examination subject, in contrast to this closely surface-proximal x-ray radiation 13 is screened by the roughness on the surface 2. By means of long-term tests, it has been shown that, given a typical load of a standard anode plate with 60 kW electron shots, at the end of its lifetime the surface roughness values can be 45 μm (RZ), and this can cause a weakening of the wanted x-ray radiation by 14% and more. Since the portion of the wanted x-ray radiation is relatively small in relation to the total generated x-ray radiation anyway, it would be of great advantage. Particularly for use in a computed tomography apparatus, to prevent an additional dosage loss of over 10% and more due to a focal path deterioration.

The deterioration of the focal path is directly dependent on the extent of the power acting on the surface. Therefore, previous methods have aimed at extending the lifespan of x-ray anodes predominantly by reducing this power. A possibility theoretically exists to increase the rotation speed of the anode plate so that the focal path surface moves more quickly under the focal spot. Since the load of the surface can be reduced only with the square root of the rotation speed, however, the limit of the effective improvement methods is reached relatively quickly. A necessary quadrupling of the rotation speed in order to halve the load of the anode surface is, due to the carrier load, unrealistic given normal carrier design. This is true both with the use of ball bearings and with the use of floating bearings to journal the anode plate. A further attempt to reduce the focal path load is a dosage modulation in CT systems, in which the radiation dosage is always lowered by 20% when a patient is irradiated from the front or back. Although the deterioration is thereby temporally delayed, it is not prevented. Furthermore, for specific applications, a desired further increase of the pulse power (a short-duration increase of the x-ray output power) inevitably leads to an increased deterioration of the focal path.

SUMMARY OF THE INVENTION

An object of the present invention to provide an x-ray anode with a highly thermally stressable surface, as well as a method to produce such an x-ray anode, in which the probability of the formation of thermal stress tears, as well as a roughening of the surface due to the thermal load, is largely prevented or at least reduced to a significant degree.

This object is achieved by an x-ray anode according to the invention wherein, in the surface that is struck by electrons, the x-ray anode is cored (at least in regions) by defined microslits, which are correspondingly introduced in the surface in the production or in an after-treatment of the x-ray anode. Such defined microslits are slits with dimensions in the µm range that are separated from one another in the µm range.

It has been established that the roughening of a surface that is exposed to strongly varying stresses is primarily ascribed to the fact that, given a heating, the heated microscopic volume portions initially expand in the elastic region. The volume elements thereby constrain one another, which leads to a formation of compressive stress. Sometimes the compressive stress is so high that the plastic pressure yielding point is exceeded, and specific deformation events are triggered. The material flows upwardly to the surface, since to the sides and below a macroscopic expansion constraint exists due to the adjacent volume elements. This material flow to the surface is initially relatively imperceptible however, given a larger number of thermal stress cycles, this accumulates, to that it can lead to a corrugation of the surface that resembles an orange peel. Furthermore, due to the macroscopic expansion constraint, it leads to flow events within the material, such that the substance in the material itself is plastically compressed, even when macroscopically the dimensions of the volume element remain the same in the sideways length. These two events are irreversible with regard to the plastic component. Given cooling, the material tends to contract exactly as much as it had previously expanded. Since a portion has flowed away upwardly, however, this material volume is missing, and given frequent repetition of the effect it leads to tear formations in the surface.

By the introduction of defined microslits in the surface, material volumes exposed to thermal stresses are freed from mutual expansion constraints, such that microscopic volumes located between the microslits can move freely and can expand laterally in all directions without colliding with an adjacent volume element. Therefore, the material deformation remains elastic approximately to its original condition, meaning the macroscopic volume elements can expand and contract again upon cooling, without a remaining material deformation ensuing. Substantial plastic expansions and compressions and, as a consequence thereof, material wear are prevented. Consequently, the formation of cracks and the roughening of the surface are significantly prevented.

The microslits, in principle, can be arbitrarily introduced in the surface. Preferably, the separation between the microslits is not too large, so that the expansion movement of a volume region located between two microslits does not reach into the plastic region, which would allow a significant material wear to start. In long-term tests, it has been determined that the separation between two adjacent microslits preferably is between 50 and 300 µm. More specifically separation is between 100 and 150 µm.

The microslits preferably are arranged in a defined microslit structure, meaning in a specific pattern. The optimal format or arrangement of the microslits depends on the type of the stress, as well as the physical form of the x-ray anode. The precise dimensions and positions of the slits relative to one another therefore should be optimized dependent on the particular stress and the type of the x-ray tube or x-ray anode. Under the circumstances, it is reasonable to determine the optimal form for the respective x-ray anode and the application in advance in suitable parameter studies.

In a preferred exemplary embodiment, the microslits are substantially parallel to each other in one direction, at least region-by-region, with a specific spacing.

In another preferred exemplary embodiment, the microslits are arranged in a grid at least in regions, with a specific spacing, such that small volume elements circumferentially bounded by microslits are formed. In a further particularly preferred exemplary embodiment, the microslits are honeycomb-shaped or similar to a honeycomb, at least in sections, meaning including geometric distortions based on affine projections.

The microslits generally must not be deeper than 100 µm. The depth is preferably between 30 and 100 µm, particularly preferably between 50 and 100 µm.

In a preferred exemplary embodiment, microslits arranged adjacent to one another exhibit different slit depths. A heat flow in the inner material of the x-ray anode is thereby hindered as little as possible.

The width of the microslits is preferably between 3 and 15 µm.

The slit aspect ratio, meaning the ratio of the width to the depth of the microslit, is preferably in the range of 1:10, meaning that, for example, an approximately 60 µm-deep microslit exhibits a width of approximately 6 µm.

The microslits can be introduced in the surface in various ways.

One possibility is to burn the microslits into the material of the surface with a laser beam. For this, a normal laser or an excimer laser can be used which can be operated in continuous operation or in pulsed operation. An additional laser with lower laser power preferably is used in order to locally preheat or reheat the surface before the introduction of the microslits. Preferably, a reaction gas, for example atmospheric air, $O_2$, $CO_2$, a halogen-containing gas, or a halogen, is used in order to rapidly remove (ablate) the surface material heated by the laser to form the microslits.

A further possibility to produce the microslits is the use of a high-pressure water jet. To support the high-pressure water jet, a secondary jet such as a jet of corundum, quartz or sand can be used. In the production of microslits in x-ray anode tubes, tungsten powder preferably is used.

The microslits also can be introduced in the surface using a spark erosion method. The spark erosion can be implemented in water or in oil. For vacuum-hygiene reasons, an introduction of microslits preferably ensues in an aqueous or alcoholic saline solution.

In particular when the invention is to be used in order to prevent formation of thermal stress tears that form tear seeds for mechanical fracturing cracks, the microslits are designed such that they can not themselves act as tear seeds for deterioration tears or creeping tears. In such cases, the slit base preferably is rounded, both from a mechanical fracture viewpoint and with regard to the Lord-Sneddon equation, meaning to an extent sufficient to prevent a mechanical stress increase. Moreover, preferably the microslits are wider in a slit base area than at the surface. This can be achieved, for example, in the production of the microslits by means of a laser beam or a high-pressure water jet. The laser beam or high-pressure water jet is directed at the various positions along the microslit multiple times (meaning at least twice), whereby the angle of the jet or beam direction relative to the slice base is varied transversely to the slice length direction. For this purpose, the jet direction can be turned transversely to the slit length direction at a specific position along the microslit to be introduced, and then subsequently the laser beam or high-pressure water jet can be adjusted a bit further in the slit length direction. Alternatively, the laser beam or high-pressure water jet can be moved along multiple times in the slit length direction, with among other things, other angles relative to the slit length direction being used.

DESCRIPTION OF THE PREFERRED EMBODIMENTS

Figure 1:
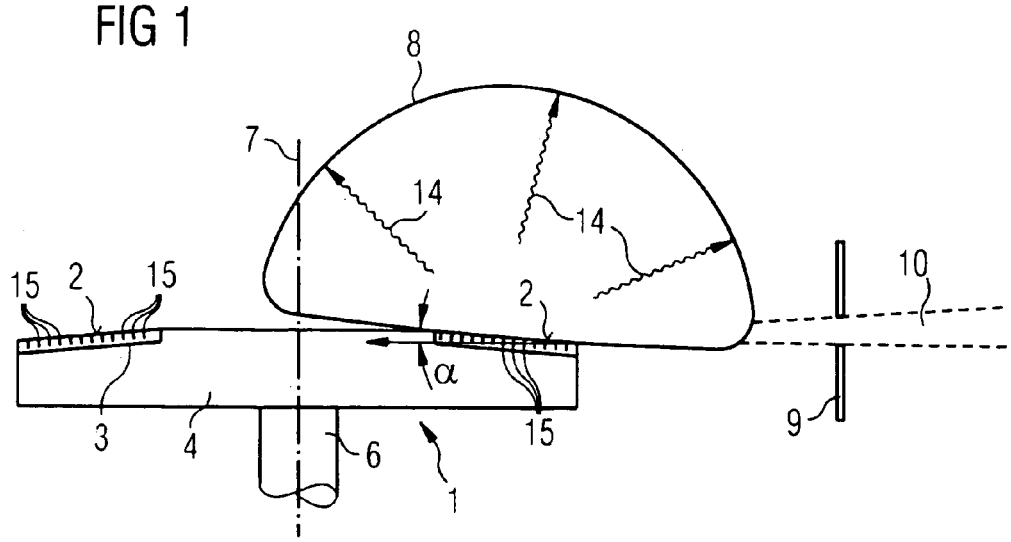
FIG. 1 is a section through an x-ray rotating anode with microslits introduced in the focal path surface according to the invention.
Figure 2:
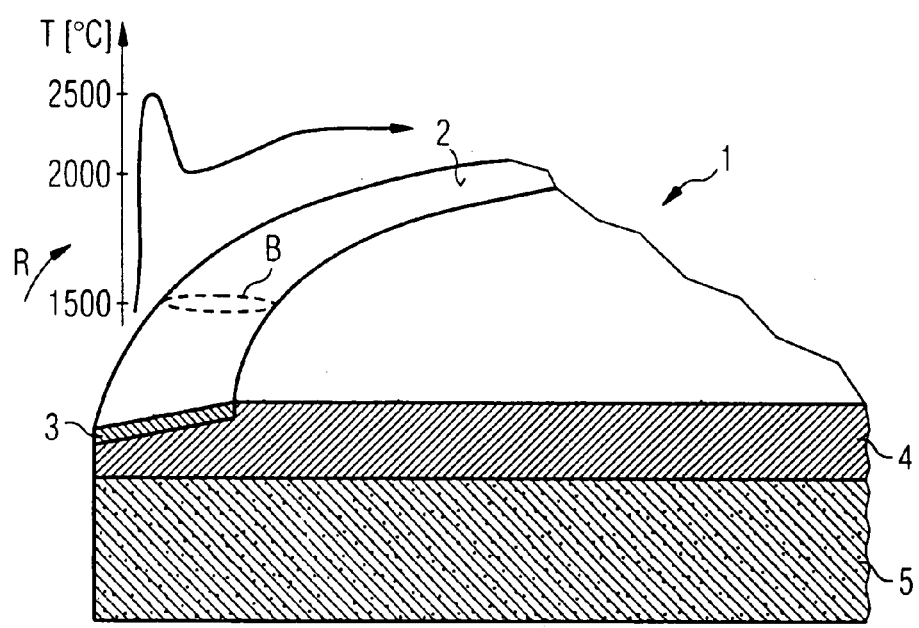
FIG. 2 is an enlarged partial cross-section of a standard rotating anode according to the prior art.

In the description below, it is assumed, insofar as it is not noted otherwise, that the x-ray anode 1 is a rotating anode 1 having a focal path surface 2 in which microslits are introduced. FIGS. 1 and 2 show the principle assembly of such a rotating anode 1.

The rotating anode 1 is a substantially planar, circular anode plate 4 made from molybdenum or TZM. A material layer 3 made of tungsten, with a proportion or approximately 5% rhenium (WRe 5) is located along the outer circumference. The surface 2 of this layer 3 is the focal path surface that, as was already described above in connection with FIG. 2, is exposed to strongly varying thermal stresses. The anode plate 4 is attached to a shaft 6, via which the anode plate 5 is displaced in rotation around the axis of symmetry 7 lying perpendicular to the plate surface. The focal spot B, at which the accelerated, high-energy electrons strike on the focal path surface 2, thereby moves around the focal path surface 2. By interaction with the high-energy electrons, at the focal spot B the x-ray radiation 14 is generated, which is radiated from the surface outwardly in all directions. The x-ray beam hemisphere 8 shown in FIG. 1 is generated. Only a small portion, which is radiated laterally outwardly as shallowly over the surface 2 as possible, is actually used. The remaining portions are gated by a surrounding housing or by a diaphragm 9. The focal path surface 2 is canted outwardly at an angle a of 7°.

Figure 3:
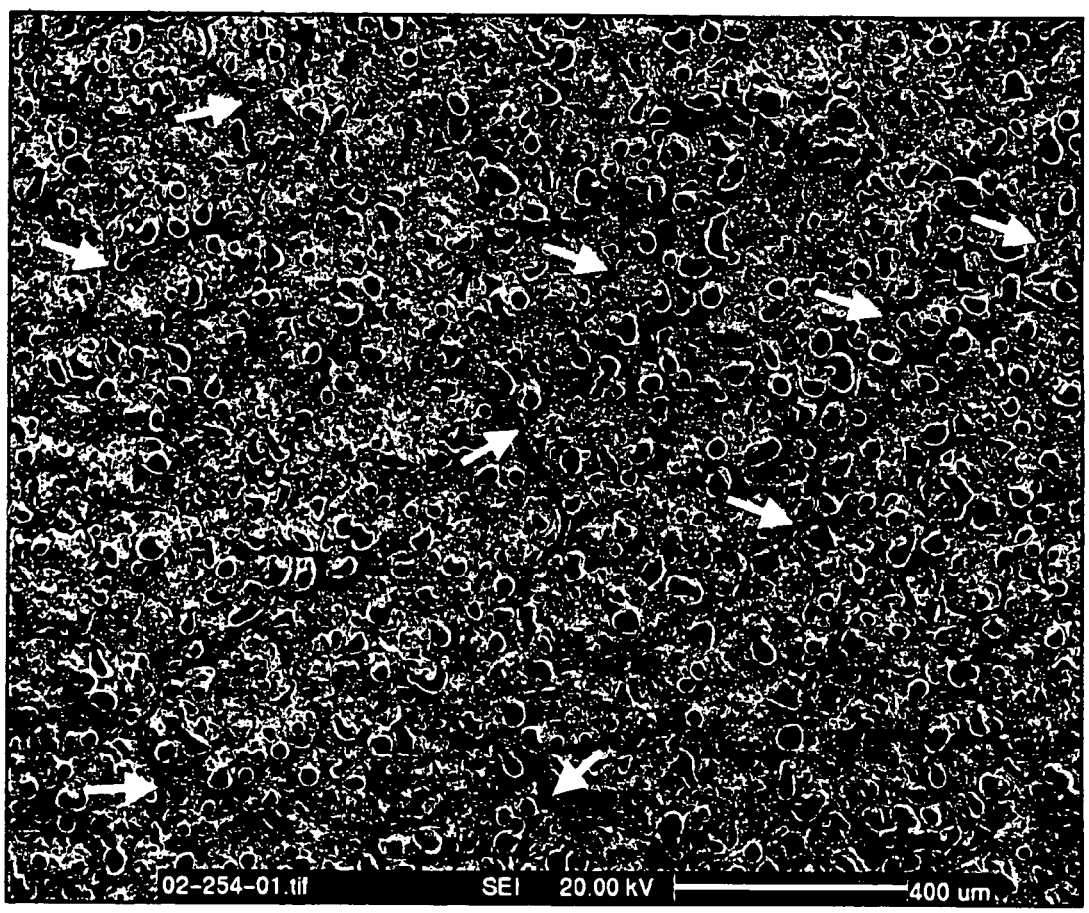
FIG. 3 is a photomicrograph of a section of the focal path surface of a conventional used rotating anode plate.
Figure 4:
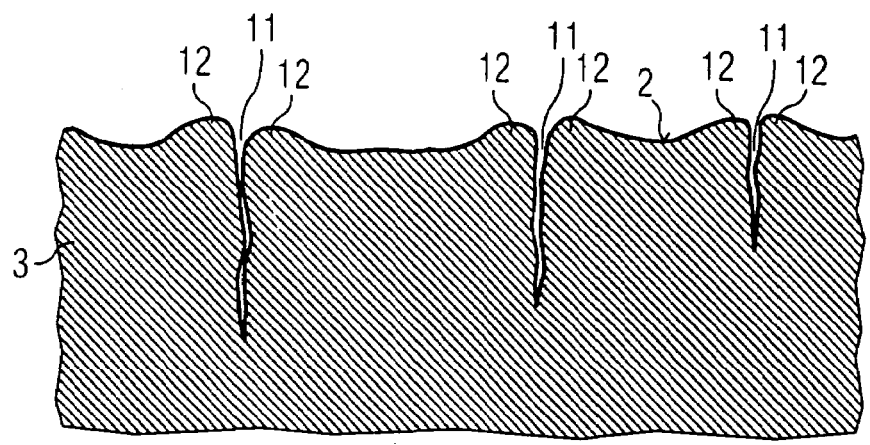
FIG. 4 is a schematic representation of the formation of thermal shock tears in a significantly thermally stressed surface of an x-ray anode.
Figure 5:
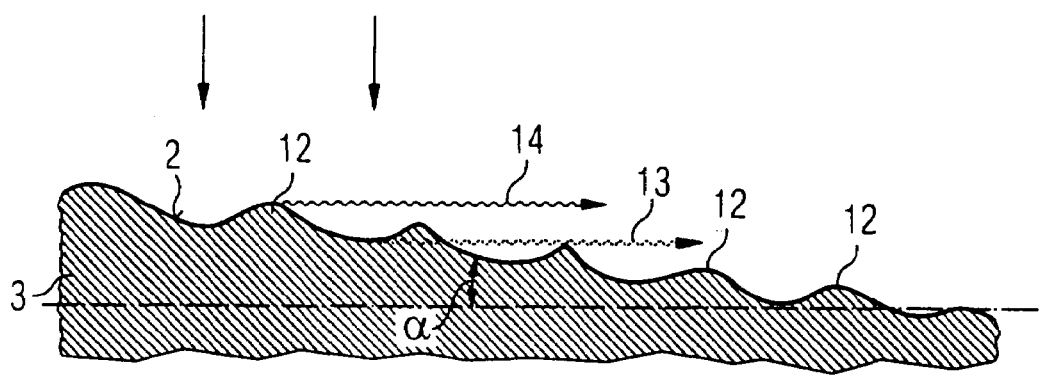
FIG. 5 is a representation of the reduction of the wanted x-ray radiation due to the roughening of the surface of a standard rotating anode.

FIG. 1 shows—in significantly enlarged representation relative to the anode plate 4—inventive, circular circumferential microslits 15 introduced into the focal path surface 2, An x-ray anode according to the prior art, as shown in FIG. 2, does not exhibit such microslits. FIGS. 3 through 5 have already been described above in detail to explain the disadvantageous effect of the thermal stress on the surface roughness, as well as its effect in the form of a reduction of the wanted x-ray radiation.

Figure 6:
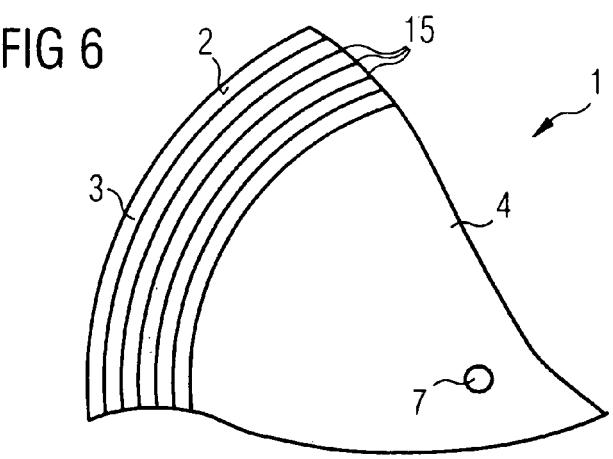
FIG. 6 is a plan view of portion of a rotating anode with circular circumferential microslits introduced in the focal path surface (with a significantly enlarged representation of the microslits).
Figure 7:
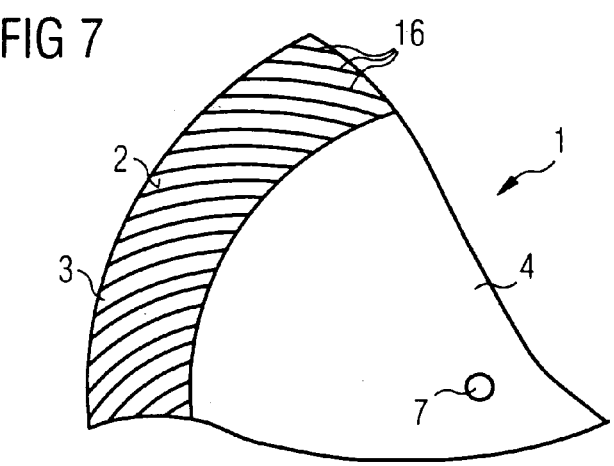
FIG. 7 is a plan view of a rotation of a rotating anode with spiral-shaped microslits introduced in the focal path surface (with a significantly enlarged representation of the microslits).
Figure 8:
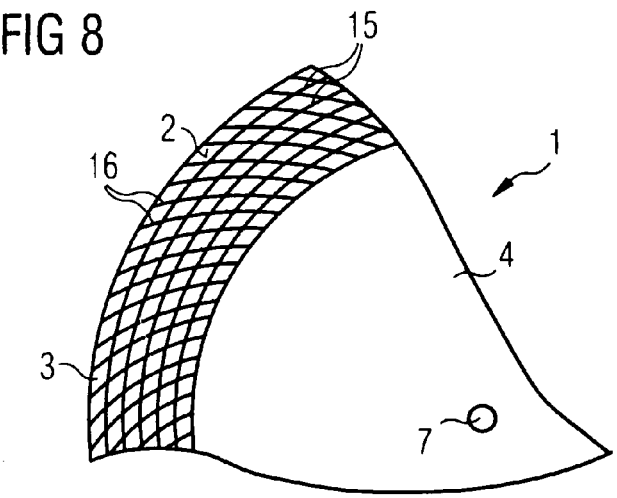
FIG. 8 is a plan view of a portion of a rotating anode with spiral-shaped and circular circumferential microslits introduced in the focal path surface (with significantly enlarged representation of the microslits).

FIGS. 6 through 8 show various possibilities to introduce the inventive microslits in the focal path surface 2. In all representations, the microslits are hereby again shown significantly enlarged relative to the anode plate in order to clarify the principle.

FIG. 6 shows the relatively simple exemplary embodiment (also shown in FIG. 1) in which a number of microslits 15 are circularly (meaning concentric with the circumference) introduced in the focal path surface 2.

Alternatively, the microslits can be introduced in the radial direction. The disadvantage of such radially arranged microslits is, however, that the focal spot constantly changes its position when the electron beam hits the base of a slit, or when it hits on the surface between two microslits. Therefore, the slits preferably are not precisely radial, but rather are displaced by approximately 15°–30° relative to the radial direction, such that the microslits 16 run approximately spiral-shaped, as is shown in FIG. 7.

FIG. 8 shows a preferred exemplary embodiment in which, with circular circumferential microslits 15, and with spiral-shaped microslits 16, a grid-like microslit pattern is generated, such that very small, individual volume elements were formed that can freely expand in all directions.

FIGS. 9 through 18 respectively show enlarged sections of surfaces that are provided with different inventive microslit structures.

Figure 9:
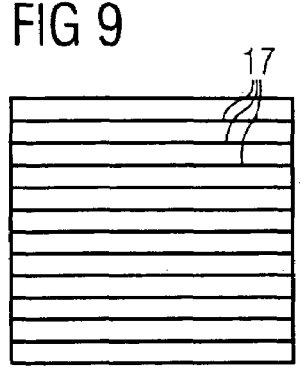
FIG. 9 is an enlarged section from a surface with an inventive microslit structure according to a fourth exemplary embodiment.
Figure 10:
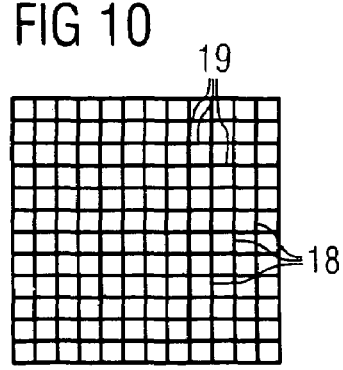
FIG. 10 is an enlarged section from a surface with an inventive microslit structure according to a fifth exemplary embodiment.

FIG. 9 shows a simple arrangement of parallel microslits 17. FIG. 10 shows an arrangement with microslits 18, 19 arranged perpendicular to one another respectively parallel side by side, so a grid structure results.

Figure 11:
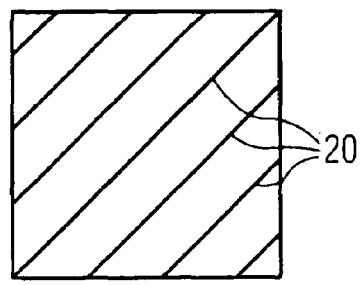
FIG. 11 is an enlarged section from a surface with an inventive microslit structure according to a sixth exemplary embodiment.
Figure 12:
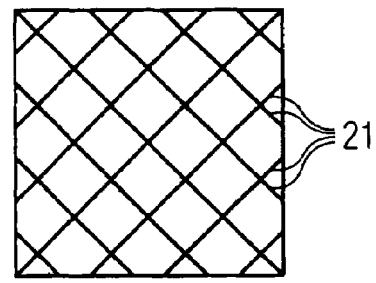
FIG. 12 is an enlarged section from a surface with an inventive microslit structure according to a seventh exemplary embodiment.

FIG. 11 shows parallel microslits 20 that are slanted over the shown volume element, and FIG. 12 in turn shows parallel microslits 21 arranged perpendicular to one another but slanted relative to the shown section of the surface, so a diamond-shaped pattern is formed. The angular position of the slits running in parallel is thereby, in principle, arbitrary. In particular, an arbitrary rhombus pattern can be generated by an arrangement of parallel microslits running transversely to one another.

Figure 13:
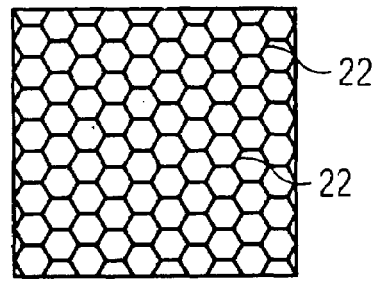
FIG. 13 is an enlarged section from a surface with an inventive microslit structure according to a eighth exemplary embodiment.
Figure 14:
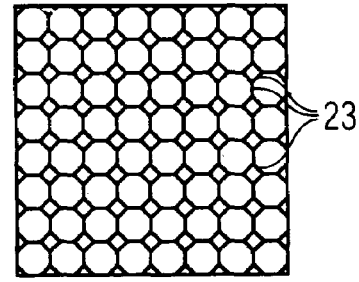
FIG. 14 is an enlarged section from a surface with an inventive microslit structure according to a ninth exemplary embodiment.

FIG. 13 shows a honeycomb pattern formed from a number of microslits 22 arranged in hexagons. FIG. 14 shows a pattern in which hexagonal volume elements are likewise formed from a number of short microslits 23. These hexagonal volume elements border one another with their side surfaces running in parallel to one another, such that a small, four-sided volume element results between four hexagons.

Figure 15:
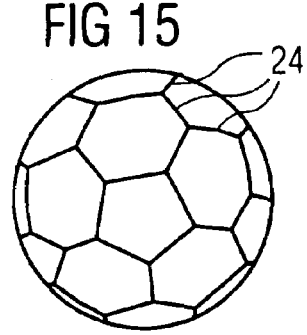
FIG. 15 is an enlarged section from a surface with an inventive microslit structure according to a tenth exemplary embodiment.

FIG. 15 shows a variant that is particularly suited to provide a curved surface with microslits 24 similar to a honeycomb pattern. This is a pattern combination of hexagons and pentagons such as is found on soccer balls, for example.

Figure 16:
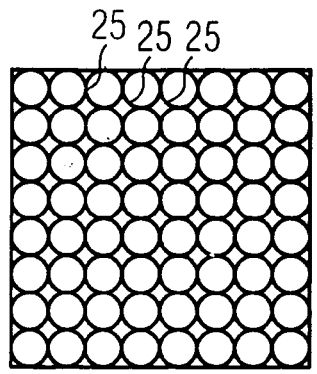
FIG. 16 is an enlarged section from a surface with an inventive microslit structure according to a eleventh exemplary embodiment.
Figure 17:
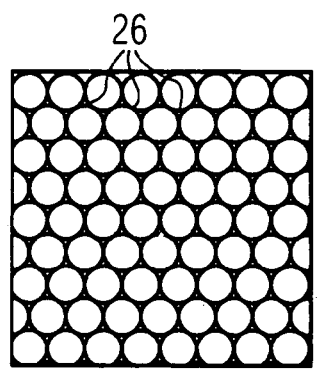
FIG. 17 is an enlarged section from a surface with an inventive microslit structure according to a twelfth exemplary embodiment.

FIG. 16 shows an exemplary embodiment in which the microslits 25 are circularly introduced in the surface 2, the circles being arranged matrix-like in rows and columns relative to one another. FIG. 17 shows a somewhat different variant with circular microslits 25, wherein the circles of two adjacent rows are displaced relative to one another in order to achieve a denser packing of the individual circle volume segments.

Figure 18:
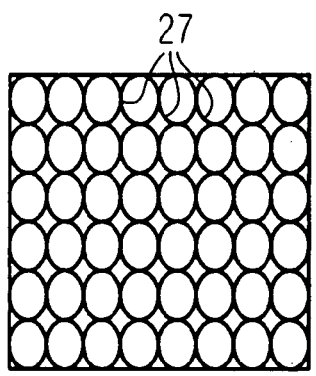
FIG. 18 is an enlarged section from a surface with an inventive microslit structure according to a thirteenth exemplary embodiment.

FIG. 18 shows an exemplary embodiment with elliptical microslits 27 introduced in the surface 2. Various variants of this version are also possible, such as, for example, a rotation of the ellipses by 90° or by 45°.

In addition to the shown exemplary embodiments, arbitrarily different patterns can be introduced in the surface.

Both in the first patterns described and preferred for rotating anodes (FIGS. 6 through 8) and in the patterns according to FIGS. 9 through 18, the separation between the slits 15 through 27 is preferably between 50 and 150μ, particularly between 80 and 120 μm. The slit depth is preferably between 30 and 100 μm, particularly between 50 and 100 μm. As a rule, a depth of 100 μm is sufficient for rotating anode plates in x-ray tubes, since the zone of the extreme temperature increase is not deeper. Given a use of the method for other x-ray anodes in which the temperature increases reaches deeper zones, correspondingly deeper slits must by introduced. The width of the slits is preferably between 3 and 15 μm, particularly preferably between 5 and 10 μm. This means the slit aspect ratio is in the range of 1:10. The precise dimension and shape of the microslits, as well as the arrangement of the microslits or of the microslit pattern, are adapted to the precise type and shape of the x-ray anode and the thermal loads connected therewith.

Figure 19:
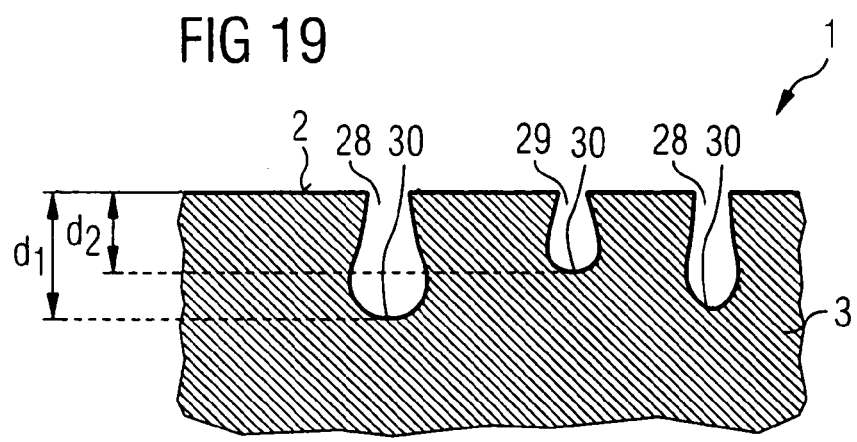
FIG. 19 is a representation of the cross-section of microslits with a rounded and widened slit base.

In particular for preventing thermal stress tears that can serve as tear seeds for larger rifts, it is useful to round off the microslit base, and to fashion the microslits wider in the area of the microslit base than at the surface. The microslits then exhibit the drop-shaped cross-section shown in FIG. 19. In this manner, it is prevented that the microslits themselves can act as seeds for larger rifts.

Additionally, adjacent slits 28, 29 preferably are implemented with different depths. In the exemplary embodiment shown in FIG. 19, the respective outer slits 28 exhibits a first depth d1 in contrast to which the slit 29 in-between them exhibits only a smaller depth d2. These displaced depths improve the heat drain inside the material.

Figure 20:
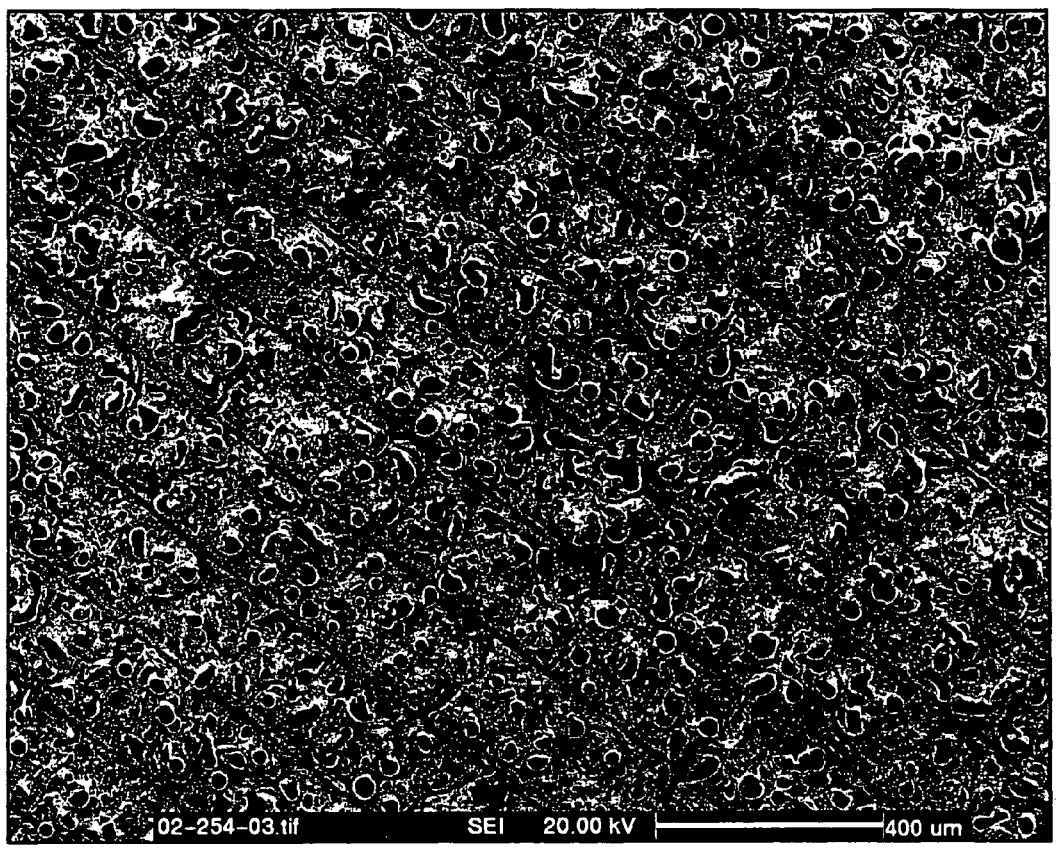
FIG. 20 is a photomicrograph of a section of the surface of a used rotating anode that was provided with a grid-like microslit pattern before initial operation.
Figure 21:
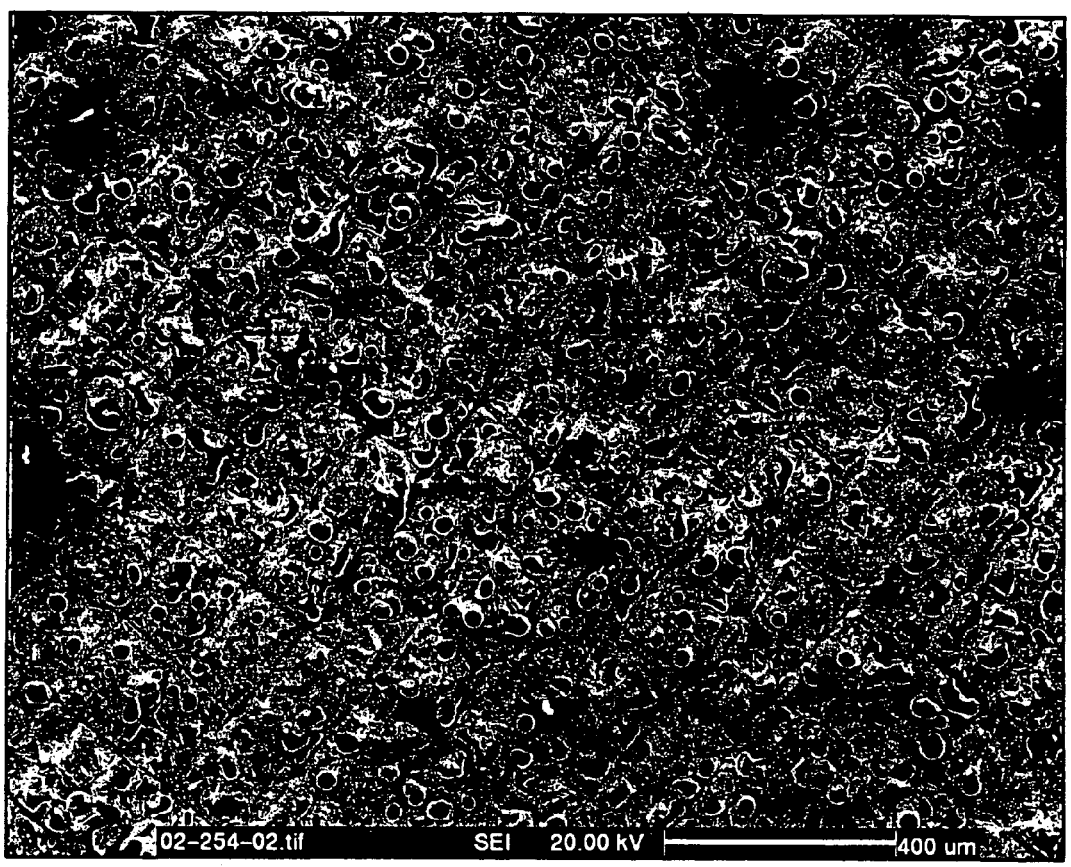

FIGS. 20 and 21 respectively show the surface of focal paths of conventional rotating anodes in which inventive microslits have been introduced by means of a laser before a use. The focal path material is WRe 5. The slits respectively have a width of approximately 7 μm and a depth of 60 μm. Here, the separation between the microslits is approximately 190 μm.

FIG. 20 shows a section from a region in which only slits running in parallel, that run substantially in a radial direction, were introduced in the surface 2. FIG. 21 shows a section from a region in which a grid structure was introduced with slits running transverse to one another in a radial and a circular direction. Both microscopic exposures respectively show an image area of 2.64 mm$^2$. A direct comparison with the microscopic exposure of a conventional untreated focal path surface shown in FIG. 3 is therefore possible.

The treated rotating anode 1 was exposed to a relatively severe thermal stress in a long-term test in which the focal path 3 was partially deliberately overloaded. In an evaluation of the images, it shows that, in the exemplary embodiment according to FIG. 20 with only radially introduced slits, almost no thermal stress tears are to be found that are parallel to the circumferential direction. This means a new formation of thermal shock tears in a different direction than the rotation-oriented ensued in substantially smaller number than in the untreated surface. Here, only 37 thermal stress tears can be counted in the 2.64 mm$^2$, in contrast to which—as mentioned above—in total 194 thermal stress tears were counted in the unprepared surface in the same area. Moreover, it has been established that the surface protuberance or surface edges are not as high as in the surface not provided with microslits.

The grid-shaped arrangement of microslits in the radial direction and in the circumferential direction, according to FIG. 2, shows a still better result. The precise evaluation of the microscopic exposure shows that, in the entire area of 2.64 mm$^2$, no new large thermal shock tears have come into existence, and, with small formations in the entire image section, only 12 thermal stress tears are to be found.

The evaluations of long-term tests show that the desired effect shows even given an extreme overload of the inventive microslits, and thereby a significant reduction of the focal path deterioration of x-ray anodes can be achieved, meaning the surface roughness of the anode surface remains in the delivery state. The method is additionally simple and cost-effective. First additional tests have shown that, for example, the process time for complete provision of the focal path surface of an anode plate only requires approximately 24 min.

Although modifications and changes may be suggested by those skilled in the art, it is the intention of the inventors to embody within the patent warranted hereon all changes and modifications as reasonably and properly come within the scope of their contribution to the art.

I claim as my invention:

1. An x-ray anode comprising:
   an anode body having a surface region struck by electrons; and
   said region of said surface having scoring formed by a plurality of defined microslits being arranged in a substantially hexagonal pattern with defined spacings of the microslits relative to each other.

2. An x-ray anode as claimed in claim 1 wherein said microslits include adjacent microslits, said adjacent microslits having a spacing therebetween in a range between 50 and 300 µm.

3. An x-ray anode as claimed in claim 1 wherein said microslits include adjacent microslits, said adjacent microslits having a spacing therebetween in a range between 100 and 150 µm.

4. An x-ray anode as claimed in claim 1 wherein each of said microslits has a depth in said body in a range between 30 and 100 µm.

5. An x-ray anode as claimed in claim 1 wherein each of said microslits has a depth in said body in a range between 50 and 100 µm.

6. An x-ray anode as claimed in claim 1 wherein said microslits include adjacent microslits, and wherein said adjacent microslits have respectively different slit depths in said body.

7. An x-ray anode as claimed in claim 1 wherein each of said microslits has a slit aspect ratio in a range between 1 and 10.

8. An x-ray anode as claimed in claim 1 wherein each of said microslits has a base region in said body, said base region having a rounded cross-section.

9. An x-ray anode as claimed in claim 1 wherein each of said microslits has a base region in said body and a surface region at said surface, and wherein said base region is wider than said surface region.

10. A method for producing an x-ray anode comprising the steps of:
    providing an anode body having a surface with a region adapted to be struck by electrons; and
    scoring at least a portion of said region of said surface with a plurality of defined microslits in a hexagonal pattern, said microslits having defined spacing relative to each other.

11. A method as claimed in claim 10 comprising scoring said region with a laser beam.

12. A method as claimed in claim 11 wherein said laser beam is generated by a first laser, and comprising the additional step of heating said region with a second laser before scoring said region with said laser beam from said first laser.

13. A method as claimed in claim 11 comprising rapidly removing material excised by said laser beam with a reaction gas.

14. A method as claimed in claim 10 comprising scoring said region of said surface with a high-pressure water jet.

15. A method as claimed in claim 14 comprising directing a secondary jet onto said region of said surface in addition to said high pressure water jet.

16. A method as claimed in claim 10 comprising scoring said region of said surface by spark erosion.

17. A method as claimed in claim 16 comprising implementing said spark erosion in a solution selected from the group consisting of aqueous solutions and alcohol saline solutions.

18. A method as claimed in claim 10 comprising scoring said region of said surface by directing and excising agent, selected from the group consisting of a laser beam and a high pressure water jet, at a plurality of positions along each microslit multiple times, and varying an angle of said excising agent relative to a base of each microslit transversely to a length of each microslit.

* * * * *